UNITED STATES PATENT OFFICE.

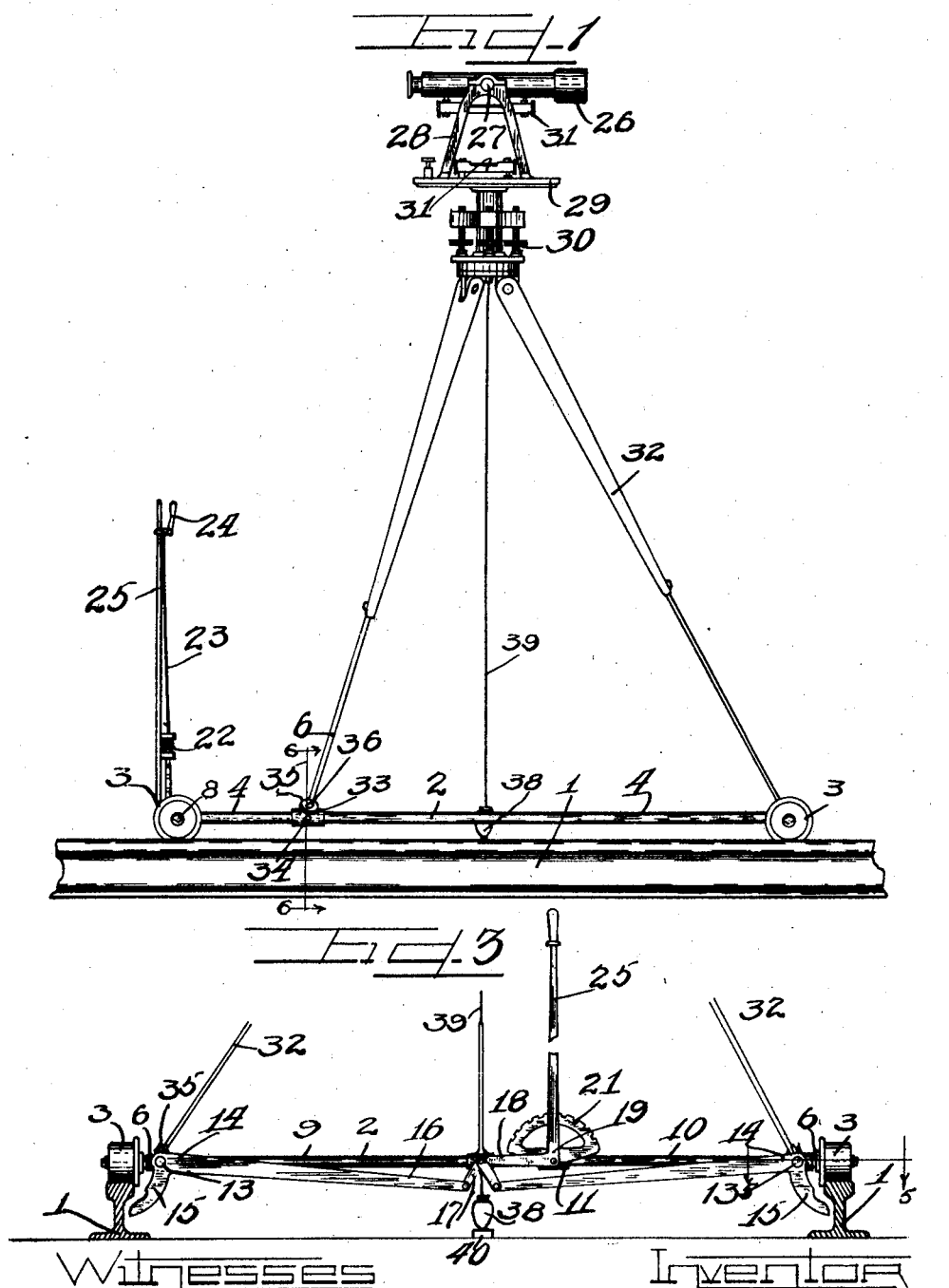

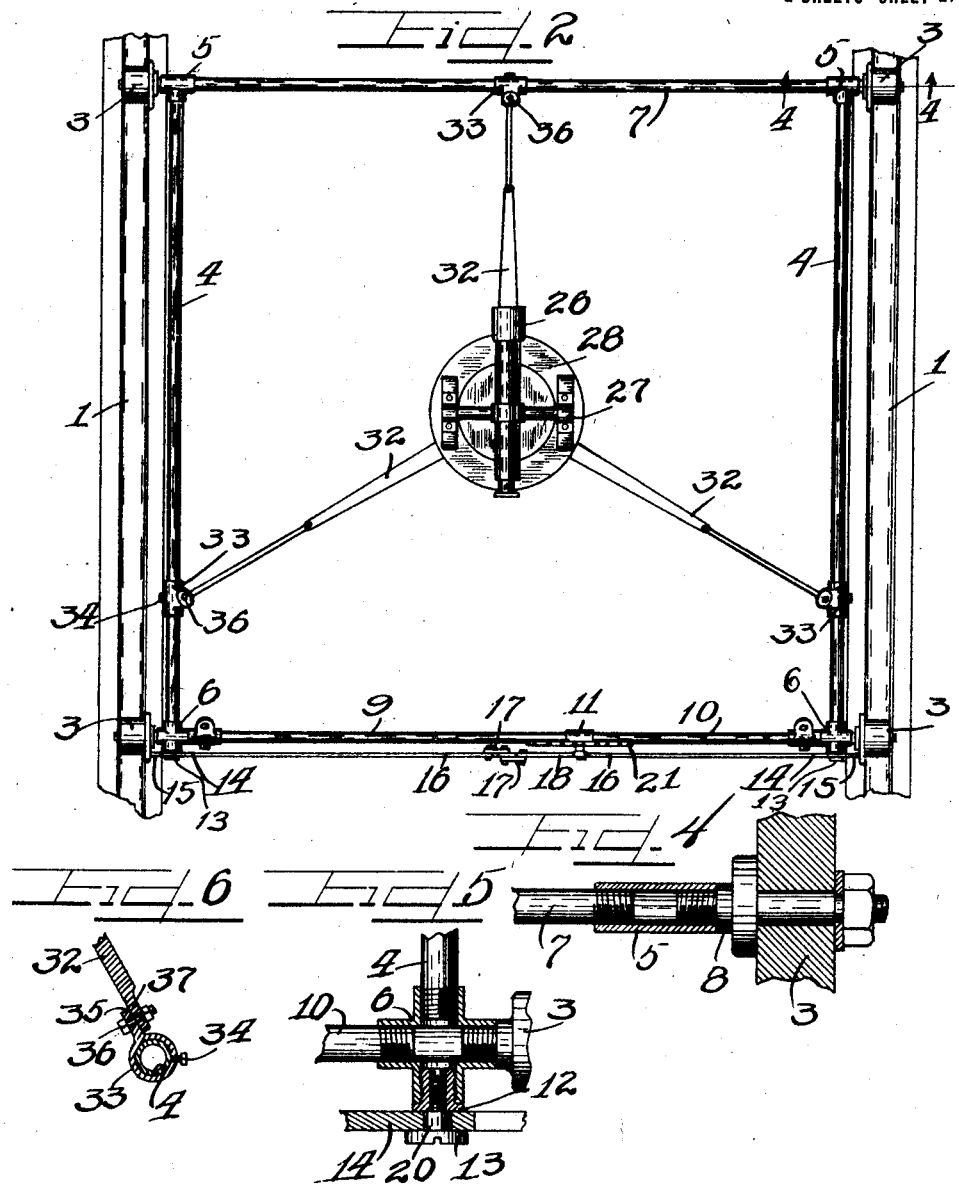

CORNELIUS G. HASTINGS, OF GLENDALE, CALIFORNIA.

CARRIER FOR SURVEYING INSTRUMENTS.

1,344,947.      Specification of Letters Patent.     Patented June 29, 1920.

Application filed February 4, 1918, Serial No. 215,308. Renewed November 17, 1919. Serial No. 338,662.

*To all whom it may concern:*

Be it known that I, CORNELIUS G. HASTINGS, a citizen of the United States, and a resident of the city of Glendale, in the county of Los Angeles and State of California, have invented certain new and useful Improvements in Carriers for Surveying Instruments; and I do hereby declare that the following is a full, clear, and exact description of the same, reference being had to the accompanying drawings, and to the numerals of reference marked thereon, which form a part of this specification.

This invention has reference more particularly to a support which is provided with wheels or other traveling facilities and adapted to have a surveyor's transit or other similar instrument mounted thereon so as to be movable from place to place.

An object of the invention is to provide a carrier adapted to support a surveyor's transit or other similar instrument, whereby the instrument can be conveniently moved from place to place.

A further object of the invention is to provide means whereby a surveyor's instrument may be moved from place to place in its adjusted position so as to be ready for use at the end of said movement without readjustment.

Another object of the invention is to provide a carrier for supporting a surveying instrument which said carrier is adapted for operation upon a railway or other similar track.

Another object of the invention is to provide a carrier, for a surveying instrument, which is movable along a track and can be locked to the track in positions to which it is adjusted thereon.

Another object of the invention is to provide means for adjustably connecting the measuring instrument with a carrier whereby the measuring instrument is universally adjustable thereon.

Another object of the invention is to provide a traveling carrier for supporting a surveyor's instrument, the said carrier having a skeleton form so as not to interfere with measurements or adjustments of the measuring instrument with reference to points on the ground below the instrument.

Another object of the invention is to provide a carrier frame which is made up of standard parts so that the parts for making up or repairing the frame may be procured without difficulty and at small expense.

The invention has also other important objects which will be apparent from the disclosures in the following specification and accompanying drawings which represent a preferred form in which my invention may be embodied.

On the drawings:

Figure 1 is a side elevation of a carrier with surveyor's transit mounted thereon in accordance with my invention, and shows a portion of a railroad track upon which it is adapted to travel.

Fig. 2 is a top view of the structure shown in Fig. 1.

Fig. 3 is a view of a lower portion of the structure shown in Fig. 1, looking from the left hand of said figure.

Fig. 4 is an enlarged fragmentary sectional view on the line 4—4 of Fig. 2.

Fig. 5 is an enlarged sectional view of portions of one corner of the frame taken on the line 5—5 of Fig. 3.

Fig. 6 is an enlarged sectional view taken on the line 6—6 of Fig. 1.

As shown on the drawings:

1, indicates a pair of rails which are arranged parallel and spaced as in the usual railroad construction. 2, indicates generally a rectangular frame which has a pair of flanged wheels 3, at each side thereof adapted to engage and roll along the upper face of the rails 1, for supporting and moving the frame from place to place. This frame may be variously constructed to serve the purpose, but may be conveniently constructed of pipe and pipe fittings comprising the two side pipes 4, parallel with and just inside the rails 1, which have the T-couplings 5, at their forward ends and the cross couplings 6, at their rear end. The heads of the T-couplings extend laterally and are connected by means of the cross pipe 7. The outer ends of the heads of the T-couplings 5, have the stub axles 8, screwed therein which have supporting wheels 3, mounted to rotate thereon. The outer ends of the crosses, likewise have stub axles 8, screwed therein, with wheels 3, journaled thereon and the inner ends of the said crosses are connected by means of the short pipes 9 and 10, which are joined at their inner ends by means of the union 11. The rear ends of the crosses 6, have a plug 12, screwed therein, the said plug 12, being tapped to have the cap screw 13, threaded therein for pivotally supporting the brake levers 14. These brake levers have the downwardly and outwardly extending portions 15, arranged to engage and grip the under face of the rail head for locking the carriage to the rail in positions of adjustment and the arms 16, of these levers extend inwardly and are connected at their inner adjoining ends by the toggle links 17, to the arm 18, of an adjustable lever 19, which has an operating lever 25, extending upwardly for manual adjustment. The levers 14, are supported on the pins 13, at the angle formed by the juncture of the arms 15 and 16, and the cap screw or pin 13, is provided with a shoulder 20, immediately under the head of the cap screw to form a bearing for pivotally supporting the lever 14, and to prevent undue tension on the levers which will interfere with their operation.

The bell crank lever 19, is pivoted at the intersection of the arms thereof on the union 11, and there is a rack sector 21, on this union adapted to be engaged by a spring pressed pawl 22, connected by means of a rod 23, to be controlled by the grip lever 24, at the upper end of the operating lever 25. This construction enables the lever 25, which controls the brake levers 14, to be adjusted so that the arms 15, of the levers 14, grip the rails and lock the carriage in this position.

The instrument mounted on this carrier is shown as an ordinary transit used for surveying purposes, comprising the telescope 26, which is horizontally pivoted as at 27, to a frame 28, that is rotatable on a table 29, the said table being supported by adjusting screws 30, whereby the instrument may be adjusted to an accurate position. Level adjustment is determined by the spirit levels 31, which are provided for this purpose. The parts just described comprising the surveying transit are mounted on a tripod consisting of the three legs 32, which are telescopically or otherwise adjusted longitudinally so that the length thereof may be varied for the purpose of obtaining the proper position for the transit.

For connecting the transit to the frame 2, each side pipe 2, and the front pipe 7, is provided with a sleeve or collar 33, thereon, which is adapted to slide lengthwise of the pipe and be secured in positions of adjustment by means of the set screw 34. Each of these collars 33, is provided with a wing or lug 35, with an opening through which may be passed a bolt 36, and the lower end of each of the legs 32, is provided with a flat perforated end 37, through which the bolt 36, may be passed or any other suitable construction may be provided for attaching the legs of the transit to or mounting them on the adjustable sleeves 33, for supporting the transit thereon. It will be observed that the pivotal connection of the lower end of the legs 32, with the collars 33, and the rotary and sliding relation of the collar 33, with the pipes 2 and 7, permits great amplitude of adjustment so that the transit may be swung over to one side of the carrier frame 2, or turned more or less with reference to the frame, to meet any position of use.

For the purpose of centering the transit with a pre-determined point or for other purposes, a plumb bob 38, is suspended by the plumb line 39, from the center of the transit intermediate of the legs 32, and it will be observed that the skeleton construction of the frame provides an unrestricted space below the transit for projection of the plumb bob, to center with a stake 40, therebelow as shown in Fig. 3, or for other similar purposes. The open construction also permits the operator to stand on the ground within the frame and prevents vibration of the instrument which would occur if it were necessary for the operator to stand on a portion of the frame that supports the transit.

The operation is as follows:

This invention is designed for use particularly in railroad construction work although it is not limited to such use but is serviceable wherever a track of any kind is provided which is suitable for use with a carrier to transport the instrument from place to place, and which will support the instrument so that readings may be taken. In railroad construction it has a great many uses such as leveling and straightening the track, in determining levels of an adjoining track or tracks which cross the one upon which it is mounted, in determining grading levels and there are many other uses to which it may be adapted.

The frame 2, is first moved to the position from which the level or other determination of the distant point is to be made and the lever 25, is adjusted to clamp the frame to the track in this position. The legs 32, of the tripod are then adjusted to locate the transit in the proper position which position may be determined by means of the plumb bob 38, or otherwise, and the instrument is then leveled in the usual manner. After the distant level or other measurement has been determined, the brake lever 25, is released and the frame 2, is then moved along the rails to the next position from which the measurement is to be taken, and the measurement may sometimes be taken without making any adjustments whatever. At any rate, it is not necessary to set up the instrument and make major adjustments as is the case with the ordinary transit and any adjustments that may be necessary are only minor adjustments to accurately correct the level of the instrument in the new position to which it has been moved.

The carriage is made up of ordinary pipe and pipe couplings so that it can be made up initially at a small cost and also in the case of breakage the parts can be easily and quickly replaced.

I am aware that various details of construction may be varied through a wide range without departing from the principles of this invention and I therefore do not purpose limiting the patent granted otherwise than necessitated by the prior art.

I claim as my invention:—

1. In a device of the class described, the combination with a track, of a frame provided with supporting means whereby the frame is movable along the track, a plurality of adjustable supporting members on the frame, a surveying instrument, and means for mounting the surveying instrument on the said adjustable supporting members of the frame.

2. In a device of the class described, the combination with a track, a frame comprising a plurality of longitudinal members, and wheels for supporting the frame on the track, supporting members adjustable lengthwise on the said longitudinal members of the frame, a surveying instrument, and means for mounting the surveying instrument on the said supporting members.

3. In a device of the class described, the combination with a track, of a frame provided with supporting wheels engaging the track, a surveying instrument adjustably mounted on the said frame, and means for clamping the said frame to the track.

4. In a device of the class described, the combination with a track comprising a pair of rails, of a frame having supporting wheels engaging the rails, a surveying instrument adjustably mounted on the said frame, a brake member adjacent each rail adapted to engage the rail, and means for simultaneously operating the brake members to engage the rails.

5. In a device of the class described, the combination with a pair of rails, a skeleton frame constructed to provide a space embraced by the members of the frame, wheels on the frame engaging the rails, and a surveying instrument mounted above and movable within the space embraced by the members of the skeleton.

6. In a device of the class described, the combination with a pair of rails, a pair of spaced longitudinal members positioned one adjacent each rail, a pair of spaced longitudinal members connecting the ends of the first mentioned longitudinal members, a roller at the juncture of the longitudinal members and engaging a rail, supporting members movable lengthwise on the said longitudinal members, a tripod having each leg thereof connected with a supporting member and adjustable so that the apex of the tripod is movable to different positions above the space intermediate of the spaced longitudinal members, and a surveying instrument mounted on the said tripod.

7. In a device of the class described, the combination of a rectangular frame comprising parallel pipes and pipe couplings connecting the adjoining ends of the pipes, track wheels secured to the said pipe couplings, sleeves on the said pipes adjustable lengthwise thereof, a tripod having adjustable legs connected with the said sleeves, and a surveying instrument mounted on the tripod.

In testimony whereof I have hereunto subscribed my name in the presence of two subscribing witnesses.

CORNELIUS G. HASTINGS.

Witnesses:
F. McG. KELLEY,
CALVIN WHITING.